Sept. 1, 1959   S. D. ROSS   2,902,451
DIELECTRIC COMPOSITIONS
Filed Nov. 2, 1953
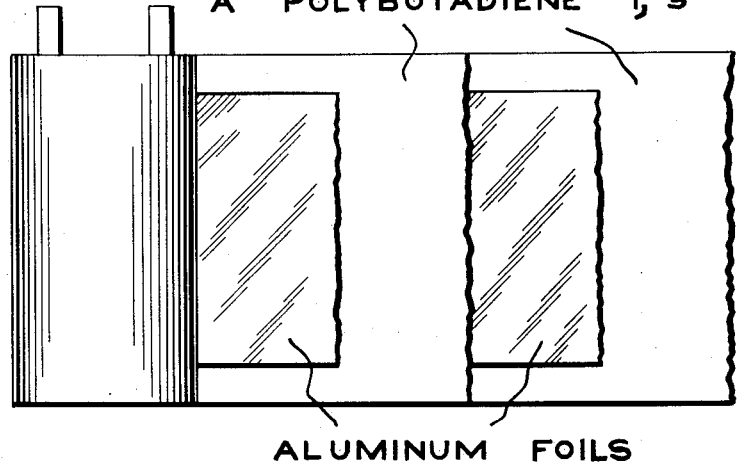
INVENTOR.
SIDNEY D. ROSS
BY
HIS ATTORNEYS

2,902,451

DIELECTRIC COMPOSITIONS

Sidney D. Ross, Williamstown, Mass., assignor to Sprague Electric Company, North Adams, Mass., a corporation of Massachusetts Application November 2, 1953, Serial No. 389,577

6 Claims. (Cl. 252—66)

This invention relates to improved dielectric materials and more particularly to aliphatic and aromatic dielectric materials and their halogenated derivatives to which relatively small amounts of certain stabilizing agents have been added. It also concerns itself with electrical devices, especially capacitors, in which the metal conductors are insulated with such dielectric compositions.

The use of stabilizing agents for dielectric materials is not new. In recent years various sources of literature have shown that small additions of certain organic substances to capacitor impregnants have caused marked extension of life of the components, particularly at elevated temperatures. Material such as the quinones, certain nitro aromatic compounds, and anthraquinones have been suggested and have found at least limited use for halogenated organic dielectric materials.

While these inhibitors or stabilizing agents do contribute to improved results when employed in moderate percentages, they are in no way completely successful. When used in amounts insufficient to deleteriously affect the primary dielectric's electric properties, the period of stabilization at any given temperature is somewhat limited and for long life at moderately elevated temperatures results are not satisfactory. When large amounts of the stabilizer are employed, the insulation resistance, power factor, dielectric constant and/or melting point may be affected to an extent sufficient to prohibit the use of the composition in high quality capacitors of any given volume and rating.

It is an object of the invention to overcome the foregoing and related disadvantages. A further object is to produce new and useful dielectric compositions. A still further object is to produce new and useful electrical capacitors which may be operated at elevated temperatures for extended periods without failure. Additional objects will become apparent from the following description and claims.

These objects are attained in accordance with the present invention wherein there is produced a dielectric composition comprising a dielectric material selected from the class consisting of aliphatic and aromatic hydrocarbons and halogenated derivatives thereof in which is dissolved a low molecular weight polymer of the group consisting of butadiene-1,3 and alkyl and aryl substituted derivatives thereof.

In a more restricted sense this invention is concerned with a dielectric composition comprising chlorinated naphthalene containing from about 5% to about 15% of liquid polybutadiene-1,3.

The invention is also concerned with electrical capacitors comprising aluminum electrode foils separated by porous dielectric spacing material impregnated with one of the dielectric compositions of this invention.

My invention is based upon the discovery that low molecular weight polymers of 1,3-butadiene and of alkyl and aryl substituted derivatives thereof are especially effective stabilizers for a number of organic dielectric materials including chlorinated naphthalene and biphenyls, synthetic polymers of the isobutylene type, and mineral oil compounds.

A particular advantage of my dielectric materials is that the operational life at elevated temperatures is increased by factors of 500 to 600% over the non-stabilized dielectric material and furthermore exhibits an insulation resistance which is much higher than any of the known inhibitors such as azobenzene; the latter has been limited in use because it lowers even the room temperature leakage resistance to a marked degree. While liquid polybutadiene, having a molecular weight of about 1500, has been found outstanding as a stabilizing material for the known dielectric impregnants, it is also possible to use substituted derivatives thereof in which the butadiene hydrocarbon is substituted with alkyl and aryl substituents. As examples of alkyl substituted butadiene-1,3 compounds within the scope of my discovery, 2,3-dimethyl butadiene-1,3; 1-methyl butadiene-1,3 (piperyline) and 2-methyl butadiene-1,3 (isoprene). Exemplifying the aryl substituted derivatives of butadiene-1,3 is 1-phenyl butadiene. The preferred stabilizer, the liquid polymer of polybutadiene-1,3, is characterized by these typical properties: molecular weight, approximately 1500; viscosity (centipoises) at 100° F., 1600; double bonds per C—4 unit 0.8; iodine number, approximately 360. This emulsion or sodium polymerized liquid polybutadiene is of such molecular structure that it contains a substantial number of 1,2 additions, thus yielding many recurring branched structures having terminal unsaturation. It is desired to have the liquid hydrocarbon polymer exhibit at least 10% of the 1,2 addition units. However, it is much preferred to have from 30 to 50% of the 1,2 addition units, thus exhibiting in its molecular structure a large number of terminal unsaturated bonds. It has been previously indicated that the stabilizers for use with the dielectric impregnants should be low molecular weight polymers which include those compounds being liquid in nature and of relatively low molecular weight, for example 1500, and the viscous semi-solid or resinous products having molecular weights up to 10,000. Where the resinous semi-solid structures are used to exhibit proper stabilizing characteristics, they must be soluble in the dielectric material to the concentration requisite for stabilization.

The amount of stabilizers employed with the dielectric materials is ordinarily from about 5% to about 20% by weight of the dielectric material to be treated. Percentages in the order of 5 to 10% are normally employed where optimum characteristics are desired throughout any extended operating life.

The dielectric materials stabilized in accordance with the invention are meant to include chlorinated naphthalene, chlorinated biphenyl and various hydrocarbon mineral oils and synthetic polymers. Vegetable oils, such as castor oil, may also be treated. The stabilization is not limited to liquid systems since chlorinated naphthalene wax is affectively stabilized throughout its normal operating range, e.g., up to +85° C., despite the fact that its melting point is in excess of this value.

The metal electrodes which may be employed for the capacitor structure include aluminum, lead, zinc, tin, copper, silver, and the like, as well as alloys of these metals. The electrodes may consist of either metal foils or a sprayed or vapor deposited metallic film on the dielectric spacer. The housing of the capacitor may be of metal or plastic depending on the size and application of the finished unit.

The spaced material or dielectric film, which is to be impregnated and positioned between the electrodes, may be of any of the well-known types. These include cellulosic materials such as kraft paper, linen paper, regenerated cellulose, cross-linked cellulose acetate, cellulose acetate sorbate, and other well-known cellulosic materials. In addition, it includes inorganic spacing materials such as glass paper, mica paper, and other known inorganic films. It is also suitable for use with organic films such as polystyrene, polyethyleneterephthalate, polytetrafluoroethylene resin, polytrifluoromonochloroethylene resin, and other such films well-known for use in capacitor structures.

As an illustrative example of the unusual stabilizing characteristics of the compounds of the invention, a number of capacitors were rolled with aluminum foil separated by calendered kraft paper spacing totaling 0.0009" in thickness. A third of the capacitors were impregnated with chlorinated naphthalene wax to a capacity of approximately 1/10 m.f.d. and in this construction the normal voltage rating was 400 v. D.C. An additional third of the capacitors were impregnated with chlorinated naphthalene wax containing 5% by weight of liquid polybutadiene-1,3 of approximately 1500 molecular weight and the final third was impregnated with chlorinated naphthalene wax containing 10% by weight of the above polybutadiene-1,3. These latter capacitors are shown in the accompanying drawing.

The three groups of capacitors were life tested according to standard practice at 600 v. D.C. in an ambient temperature of 85° C. At the end of 170 hours four of the twelve control units impregnated with the clorinated naphthalene wax had failed. In sharp contrast to this at the end of 900 hours none of the capacitors impregnated with chlorinated naphthalene wax containing 5% of the polybutadiene had failed, although shortly thereafter 25% of the units failed and they were removed from life test. The third set of 12 units impregnated with naphthalene wax, containing 10% of the polybutadiene, showed two failures at 602 and 759 hours, respectively, with none of the other units exhibiting any failures at 85° at the end of 1100 hours after which the test was discontinued.

As a matter of interest, the power factor of the capacitors impregnated with the polybutadiene was two-thirds that of the capacitors impregnated only with the chlorinated naphthalene wax and this ratio was maintained throughout the duration of the life test.

The use of polybutadiene and the alkyl and aryl substituted derivatives thereof is not restricted to temperatures of 85° C. as, for example, polyisobutylene with an average molecular weight of about 3000 may be utilized as a paper capacitor impregnant for service at 125 to 150° C., provided that 5 to 20% of one of the above disclosed stabilizers is employed. Mineral oils have likewise been suitable for high temperature capacitors when provided with the inhibitors of the invention. Additionally, wax impregnated metallized paper capacitors, which have been found to be operable at temperatures as high as 125° C., exhibited extended life when stabilized with one of the materials falling within the scope of my present invention. The preferred combinations of the invention, namely the use of chlorinated naphthalene, chlorinated biphenyl, hydrocarbon waxes and mineral oils, and synthetic polymers such as polyisobutylene and castor oil with polybutadiene-1,3, are characterized by much extended life under electrical load at normal and elevated operational temperatures with satisfactory insulation resistance, much decreased power factor, and the further remarkable ability to stabilize against outside contaminates introduced through manufacturing or use of the dielectric spacing material.

As many apparently widely different embodiments of this invention may be made without departing from the spirit and scope thereof, it is to be understood that the invention is not limited to the specific embodiments hereof except as defined in the appended claims.

What is claimed is:

1. A capacitor dielectric composition having high electrical resistivity and a low power factor consisting essentially of a dielectric material selected from the class consisting of aliphatic and aromatic hydrocarbons and halogenated derivatives thereof in which there is dissolved 5 to 20% by weight of a low molecular weight liquid polymer of the class consisting of butadiene-1,3 and alkyl and aryl substituted derivatives thereof.

2. A dielectric composition consisting essentially of chlorinated naphthalene wax containing about 5% to about 20% of polybutadiene-1,3 having a molecular weight of about 1500.

3. A dielectric composition having high electrical resistivity and a low power factor consisting essentially of chlorinated biphenyl containing about 5% to about 20% of liquid polybutadiene-1,3.

4. A dielectric composition having high electrical resistivity and a low power factor consisting essentially of a mineral oil containing about 5% to about 20% liquid polybutadiene-1,3.

5. A dielectric composition having high electrical resistivity and a low power factor consisting essentially of polyisobutylene containing about 5% to about 20% of liquid polybutadiene-1,3.

6. A dielectric composition having high electrical resistivity and a low power factor consisting essentially of chlorinated naphthalene wax containing about 5% to about 20% of liquid polyisoprene.

References Cited in the file of this patent

UNITED STATES PATENTS

| | | |
|---|---|---|
| 1,998,350 | Wulff et al. | Apr. 16, 1935 |
| 2,109,772 | Frolich | Mar. 1, 1938 |
| 2,151,382 | Harmon | Mar. 21, 1939 |
| 2,274,305 | Remy | Feb. 24, 1942 |
| 2,358,628 | Clark | Sept. 19, 1944 |
| 2,561,226 | Powers | July 17, 1951 |
| 2,636,074 | Ross | Apr. 21, 1953 |

OTHER REFERENCES

"Stabilization of Chlorinated Diphenyl in Paper Capacitors," by Berberich et al., Ind. and Eng. Chem., Jan. 1948, vol. 40, No. 1, pp. 117–123.